United States Patent [19]
McLennan

[11] 4,090,580
[45] May 23, 1978

[54] VARIABLE LENGTH ANCHORING DEVICE FOR VEHICLE SEATS

[76] Inventor: Ronald A. McLennan, 520 Maple Row, Elkhart, Ind. 46514

[21] Appl. No.: 771,885

[22] Filed: Feb. 25, 1977

[51] Int. Cl.² .......................... B60R 21/10; B60N 1/08
[52] U.S. Cl. ........................... 180/103 BF; 296/65 R; 297/216
[58] Field of Search ............... 180/103 BF, 82 C; 296/65 A, 65 R; 297/216, 344, 355; 248/429; 91/438

[56] References Cited

U.S. PATENT DOCUMENTS

| | | | |
|---|---|---|---|
| 2,454,551 | 11/1948 | Carlson | 91/438 |
| 2,880,815 | 4/1959 | Apfelbaum | 296/65 R |
| 2,993,732 | 7/1961 | Walker | 296/65 A |
| 3,024,067 | 3/1962 | Brandoli | 297/355 |
| 3,838,746 | 10/1974 | Andres | 180/82 C |
| 3,922,029 | 11/1975 | Urai | 296/65 A |
| 3,992,046 | 11/1976 | Braess | 296/65 A |

FOREIGN PATENT DOCUMENTS

1,199,577  7/1970  United Kingdom .............. 296/65 A

*Primary Examiner*—Robert R. Song
*Assistant Examiner*—Donn McGiehan
*Attorney, Agent, or Firm*—Marmaduke A. Hobbs

[57] ABSTRACT

A variable length anchoring device for vehicle seats having a forward and rearwardly adjustable seat portion, in which a hydraulic cylinder assembly is connected to the forward part of the seat portion and to an anchor means on the floor, or other suitable support rearwardly of the forward part of the seat. A deceleration responsive mechanism controls the hydraulic cylinder assembly so that the hydraulic assembly adjusts freely while the seat is being adjusted, but becomes a rigid member in an emergency, or during a sudden deceleration, resulting from the application of the vehicle brakes. In one embodiment, the opposite ends of the cylinder are connected by a conduit, and a valve connected to the brake system controls the flow of fluid through a conduit connecting one end of the cylinder to the other.

8 Claims, 6 Drawing Figures

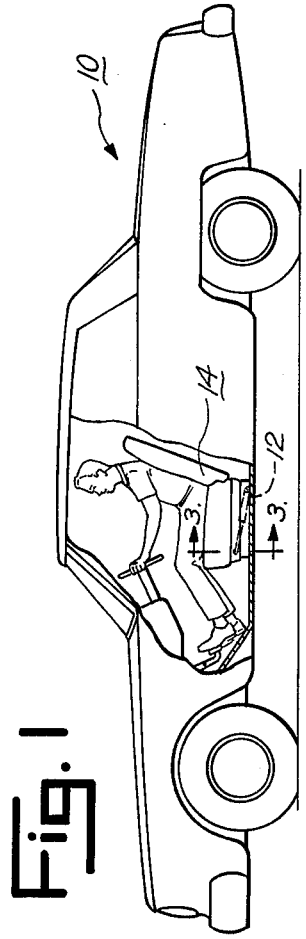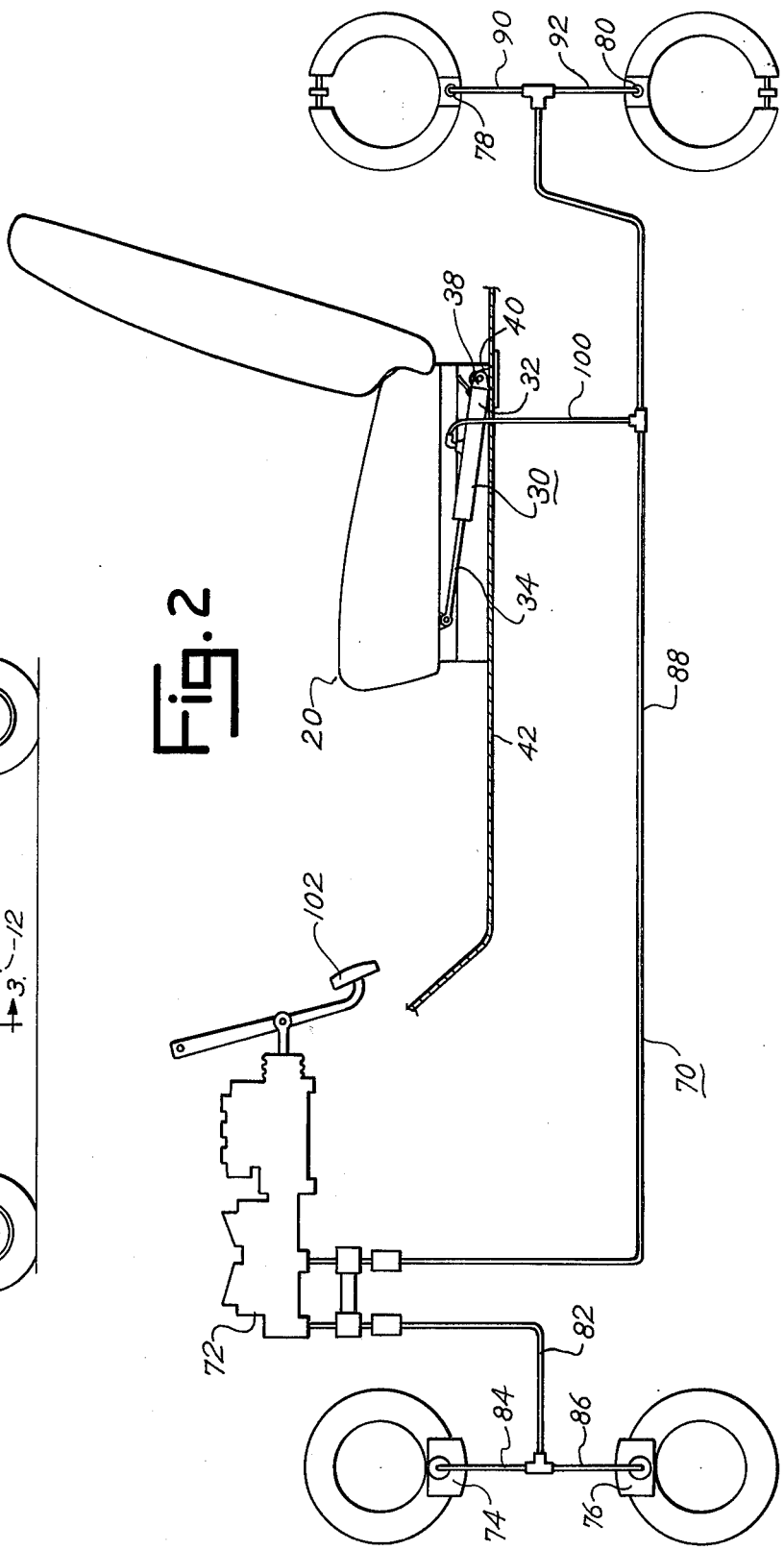

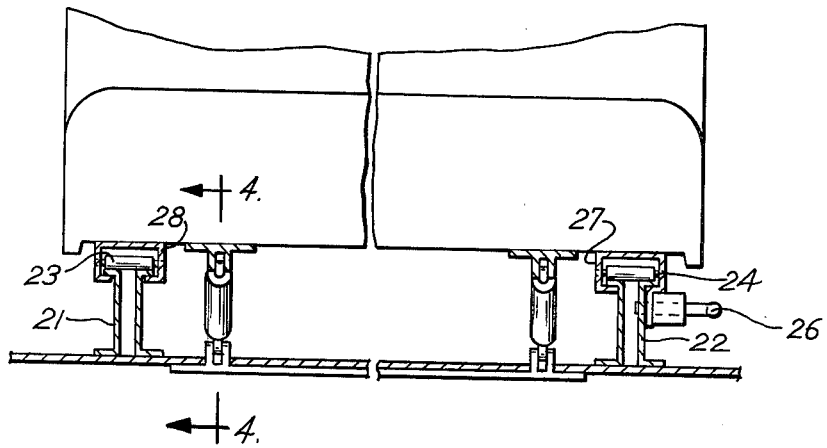
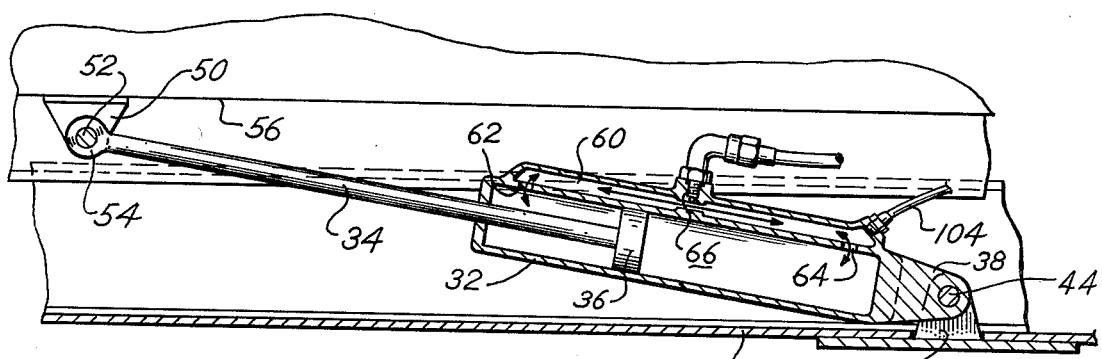
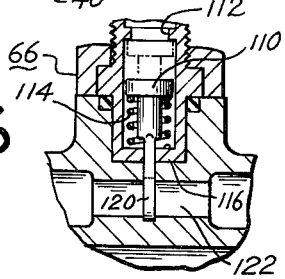
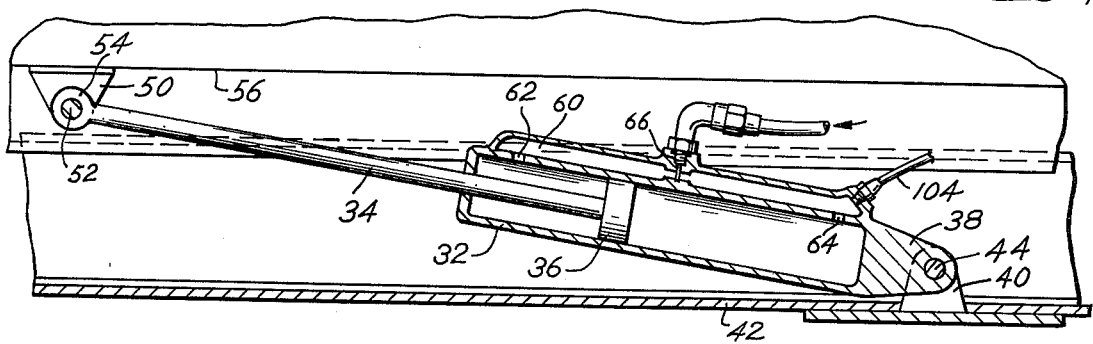

VARIABLE LENGTH ANCHORING DEVICE FOR VEHICLE SEATS

The conventional seats for automotive vehicles, such as cars and pick-up trucks, are adjustable forwardly and rearwardly in the vehicle and are normally mounted on a basic frame and/or runners which permit the occupant to select the desired position by manipulating a lever at the side of the seat and physically pushing the seat to the desired location. The frames for the seats are generally satisfactory for normal use and seat adjustments, but are often unreliable and unsafe when the vehicle becomes involved in an accident or during sudden braking of the vehicle, in that the mechanism which permits the seat to be adjusted lacks sufficient strength to prevent the seat from becoming dislodged by the accident impact and being propelled forwardly along with and into the occupant, often resulting in serious injury, or at least more serious injury, to the occupant. This situation is the result of inadequate strength of the frame, rail and latch mechanism utilized in the adjustment operation, or of inadequate or faulty latch or structure between the fixed and slidable portions of the basic frame part of the seat. The foregoing situation is present in most seat mechanisms regardless of whether the seats are manually or power adjustable, and the solution to the difficulty cannot, in most instances, be overcome by merely making the mechanism stronger or larger, since the fault often lies in the interlocking mechanism which permits the seat to be adjustable. It is therefore one of the principal objects of the present invention to provide an adjustable seat anchor for vehicles which permits the seat to be readily and easily adjusted, by either manual or power means, yet which provides an effective restraint on the seat in the event of an accident or sudden stop, and which can be installed within the frame or support for a vehicle of conventional construction without changing the seat adjusting mechanism.

Another object of the invention is to provide an adjustable seat anchoring device for vehicles, such as cars and pick-up trucks, which remains, in effect, inoperative until the vehicle is braked or decelerates rapidly, and thereafter immediately becomes effective to provide a firm, reliable anchor for the seat, and which promptly returns to its inoperative condition after the foregoing emergency conditions have passed.

Still another object of the invention is to provide an adjustable seat anchor for vehicles, which is simple in construction and operation, and which can be easily installed as original equipment or on used vehicles.

Further objects and advantages of the invention will become apparent from the following description and accompanying drawings, wherein:

FIG. 1 is a side elevational view of an automobile with a portion of the side broken away to show the front seat with an occupant therein, showing the present anchoring device in broken lines;

FIG. 2 is a partial elevational and schematic view of the front seat and brake system of an automobile, with the present adjustable seat anchoring device shown in operating position;

FIG. 3 is a partial cross sectional view of the vehicle floor and front seat supporting structure, with the present adjustable seat anchoring device mounted thereon in operative position;

FIG. 4 is a vertical cross sectional view of the adjustable seat anchoring device shown in FIG. 3, illustrating the mechanism while it is inoperative, the section being taken on line 4—4 of FIG. 3;

FIG. 5 is a vertical cross sectional view similar to that shown in FIG. 4 of the present anchoring device, showing the device in its operative condition, i.e. functioning as an anchor for the front seat of the vehicle; and FIG. 6 is an enlarged cross sectional view of a control valve seen in FIGS. 4 and 5.

Referring more specifically to the drawings, numeral 10 indicates an automobile in which the present adjustable seat anchoring device 12 has been installed beneath the front seat 14, the figures illustrating the manner in which the anchoring device is mounted and operated. The present seat anchoring device is suitable for use in connection with either bench or bucket type seats, and one or two anchoring devices can be used with either of the two types of seats. Likewise, the present seat anchoring device can be used equally as well with either manually or power operated seats without making any modifications in the device, and it is readily adaptable to various makes and types of automobiles and pick-up trucks.

The drawings show a front seat 20 of the bench type mounted on frame members 21 and 22 and tracks 23 and 24 which permit the seat to be moved forwardly and rearwardly when latch 26 is operated to release the track members 27 and 28. While the latch 26 directly controls only one side in the embodiment illustrated, it may be adapted to directly control track 28 as well as track 27. When the latch is released, the seat can be moved forwardly or rearwardly freely, and thereafter locked in place by the latch.

The present variable length seat anchoring device includes a hydraulic cylinder assembly 30 having a cylinder 32 and a rod 34 connected to a piston 36 movable axially in cylinder 32. The lower or rear end of the cylinder has a fixture 38 connected to bracket 40, the bracket 40 being rigidly and securely attached to the floor 42 of the vehicle. The fixture and bracket are pivotally connected by a pin 44 so that the cylinder can pivot angularly when an adjustment of the seat is being made. The forward end of rod 34 is connected to a bracket 50 by a pin 52 extending through an eye 54 at the end of the rod. The bracket 50 is secured rigidly to the frame 56 of the seat or to some other substantial supporting member thereof.

The opposite ends of cylinder 32 are connected to one another by a conduit 60 which is shown formed integrally with the wall of the cylinder. The conduit is connected to the forward end of the cylinder by an orifice 62 and to the rear end of the cylinder by an orifice 64. At some location between the two orifices, preferably approximately half way between the two, there is disposed a valve 66 which is adapted to interrupt the flow of hydraulic fluid between the two ends of the cylinders under vehicle braking or other emergency conditions.

The valve 66 as shown in the embodiment illustrated in the drawings, is operated by hydraulic fluid from the brake system, which is indicated generally by numeral 70. The fluid from master cylinder 72 is connected to the brake cylinders 74, 76, 78 and 80 by lines 82, 84 and 86 for the front brake cylinders and lines 88, 90 and 92 for the rear brake cylinders. As shown in the embodiment of the drawings, a line 100 connects line 88 with valve 66. Thus, when the master cylinder is operated by pedal 102, the pressure of the hydraulic brake fluid in transmitted through lines 88 and 100 to valve 66 and actuates the valve to interrupt the flow of hydraulic fluid in conduit 60 and thus prevents movement of piston 36 in cylinder 32, in effect, making the hydraulic anchoring device a rigid member between the two anchor brackets 40 and 50. A bleeder hose 140, which is normally closed by a plug or valve, is provided for eliminating pockets of air in cylinder 32 and conduit 60, this bleeder line normally being closed after the unit is fully installed. The brake fluid does not communicate with the hydraulic fluid in conduit 60, the valve 66 being responsive only to the pressure in the brake system for closing conduit 60 when the brakes are applied.

A suitable valve which may be used in the system for interrupting the flow of fluid in conduit 60 consists of a piston 110 urged in the direction to open the valve and to seat on annular rib 112 by a helical spring 114 reacting between the underside of the head and flange 116. The valve element 120 is connected to head 110 and moves downwardly when the brake pressure is increased to close orifice 122, thus interrupting the flow of fluid through the orifice and on either side of the orifice in conduit 60. When the brakes are not being applied, spring 114 is of sufficient strength to urge the valve upwardly and open orifice 122 to permit the free flow of hydraulic fluid through the conduit 60 and orifices 62 and 64. Other types of valves may be used, the one shown being included merely for the purpose of illustrating one type which may be used to perform the function of interrupting the flow of fluid in conduit 60.

While a brake system has been illustrated in the embodiment of the invention shown as the source of power for controlling the anchoring device, other systems may be used to close valve 66, such as for example, an inertia switch which senses the impact of the vehicle against an obstacle or which senses a sudden deceleration of the vehicle. Since the driver of the vehicle is in most instances able to apply the brakes before the impact, the anchoring device operated by the brake system can effectively be operated under most emergency conditions to give the added anchoring component to the seat structure. In the operation of the present variable length speed anchoring device, the seat is adjusted while the wheel brakes are off, and hence while valve 66 is open. With the valve open, the fluid can flow freely through conduit 60 and orifices 62 and 64, thus permitting piston 36 to move freely in cylinder 32 and permitting the hydraulic assembly to lengthen or shorten as required to accommodate the adjustment made in the position of the seat. After the seat has been adjusted, the hydraulic assembly remains inoperative until the brakes are applied, or until some other emergency occurs as previously mentioned herein, at which time valve element 120 of valve 66 closes immediately, thus restricting the flow of fluid in conduit 60 and making the hydraulic cylinder assembly a rigid member, since piston 36 cannot move lengthwise in cylinder 32 while the valve is closed. Thus the anchoring device provides the necessary reinforcement to resist most forces tending to dislodge the seat from its supports 21 and 22, and thereby assists in avoiding injury caused by the seat being impelled forwardly in the event of an accident or sudden braking. It is seen that the assembly will effectively adjust itself immediately and without any substantial resistance to any adjusted position of the seat rearwardly or forwardly while the brakes are not being applied, and yet will immediately form an additional and effective restraining force when an emergency does occur.

While the device is particularly useful or helpful in the case of a serious emergency, it is also helpful in normal driving, since many seat adjustment means have some degree of play, or are faulty or inadequate for even normal fast stops. In the case of a fast stop when the brakes are applied, the valve 66 is closed, thus giving additional restraint to the seat and thereby avoiding the likelihood of the seat moving forward on the track as a result or improper of defective operation of latch 26, even though the seat is not dislodged from its support. This adds substantially to the safety of the operation of the vehicle under conditions frequently encountered under normal driving in which no accident occurs.

While only one embodiment of the variable length seat anchoring device for vehicles has been described in detail herein, various changes and modifications may be made without departing from the scope of the invention. I claim:

1. A variable length anchoring device for vehicle seats having a forwardly and rearwardly adjustable seat portion: said device comprising a hydraulic cylinder assembly, fixture means for securing one end of said assembly to the forward part of said seat portion, a fixture means for securing the other end to a rigid support below said seat portion, said assembly having a cylinder, hydraulic fluid in said cylinder, a piston in said cylinder, a rod connected to said piston and extending from one end of said cylinder, means connecting the end of said cylinder opposite said rod to one of said fixture means, means connecting the end of said rod opposite said piston to the other of said fixture means, a conduit connecting opposite ends of said cylinder on opposite sides of said piston, valve means for restricting the flow of fluid between the opposite ends of the cylinder, and means responsive to the deceleration of the vehicle for closing said valve means and preventing movement of said piston in said cylinder.

2. A variable length anchoring device for vehicle seats as defined in claim 1 in which a means connects said valve means to a brake fluid line of the vehicle.

3. A variable length anchoring device for vehicle seats as defined in claim 1 in which each of said fixture means is pivotally connected to the respective means on said cylinder and cylinder rod.

4. A variable length anchoring device for vehicle seats as defined in claim 1 in which said conduit is formed integrally with the side wall of said cylinder and is connected by orifices at opposite ends thereof to opposite ends of the cylinder for free flow of fluid from one end of the cylinder to the other end when said valve means is in open position.

5. A variable length anchoring device for vehicle seats as defined in claim 2 in which said conduit is formed integrally with the side wall of said cylinder and is connected by orifices at opposite ends thereof to opposite ends of the cylinder for free flow of fluid from one end of the cylinder to the other end when said valve means is in open position.

6. A variable length anchoring device for seats of a vehicle with a hydraulic brake system and a forwardly and rearwardly adjustable seat portion: said device comprising a hydraulic cylinder assembly having a cylinder and piston, a fixture means for securing one end of said assembly to the forward end of said seat portion, a fixture means for securing the other end to a rigid support below the seat portion, and means responsive to the deceleration of the vehicle for preventing said piston and cylinder from moving relative to one another, and thereby forming a rigid anchor means between said seat portion and said rigid support.

7. A variable length anchoring device for seats of a vehicle as defined in claim 6, in which a valve means is provided for restricting the flow of fluid between the opposite ends of the cylinder in response to deceleration of the vehicle.

8. A variable length anchoring device for seats of a vehicle having a hydraulic brake system, as defined in claim 6 in which a valve means is provided for restricting the flow of fluid between the opposite ends of the cylinder in response to deceleration of the vehicle, and in which said valve means is connected to and operated by said brake system.

* * * * *